Nov. 11, 1969  G. R. ENGLUND  3,477,639
APPARATUS FOR THE CHECKING OF MULTIDIGIT NUMBERS
Filed Oct. 3, 1966  4 Sheets-Sheet 3

Nov. 11, 1969  G. R. ENGLUND  3,477,639
APPARATUS FOR THE CHECKING OF MULTIDIGIT NUMBERS
Filed Oct. 3, 1966  4 Sheets-Sheet 4

United States Patent Office 3,477,639
Patented Nov. 11, 1969

3,477,639
APPARATUS FOR THE CHECKING OF MULTIDIGIT NUMBERS
Gösta R. Englund, Stockholm, Sweden, assignor to Svenska Dataregister AB, Solna, Sweden, a corporation of Sweden
Filed Oct. 3, 1966, Ser. No. 583,731
Claims priority, application Sweden, Oct. 6, 1965, 12,979/65
Int. Cl. G06c 1/00
U.S. Cl. 235—61          12 Claims

ABSTRACT OF THE DISCLOSURE

Each ordinal position of a business machine has associated therewith a code element with each digit position thereof provided with a number of test elements corresponding to the digit and ordinal values thereof. Entry of a number (with or without a check digit) into the business machine effects a corresponding setting of the code elements to align corresponding test elements along a test path. Subsequent sensing of the test elements to a predetermined modulo is effective to indicate whether the entry is correct or incorrect.

---

Figure 1:
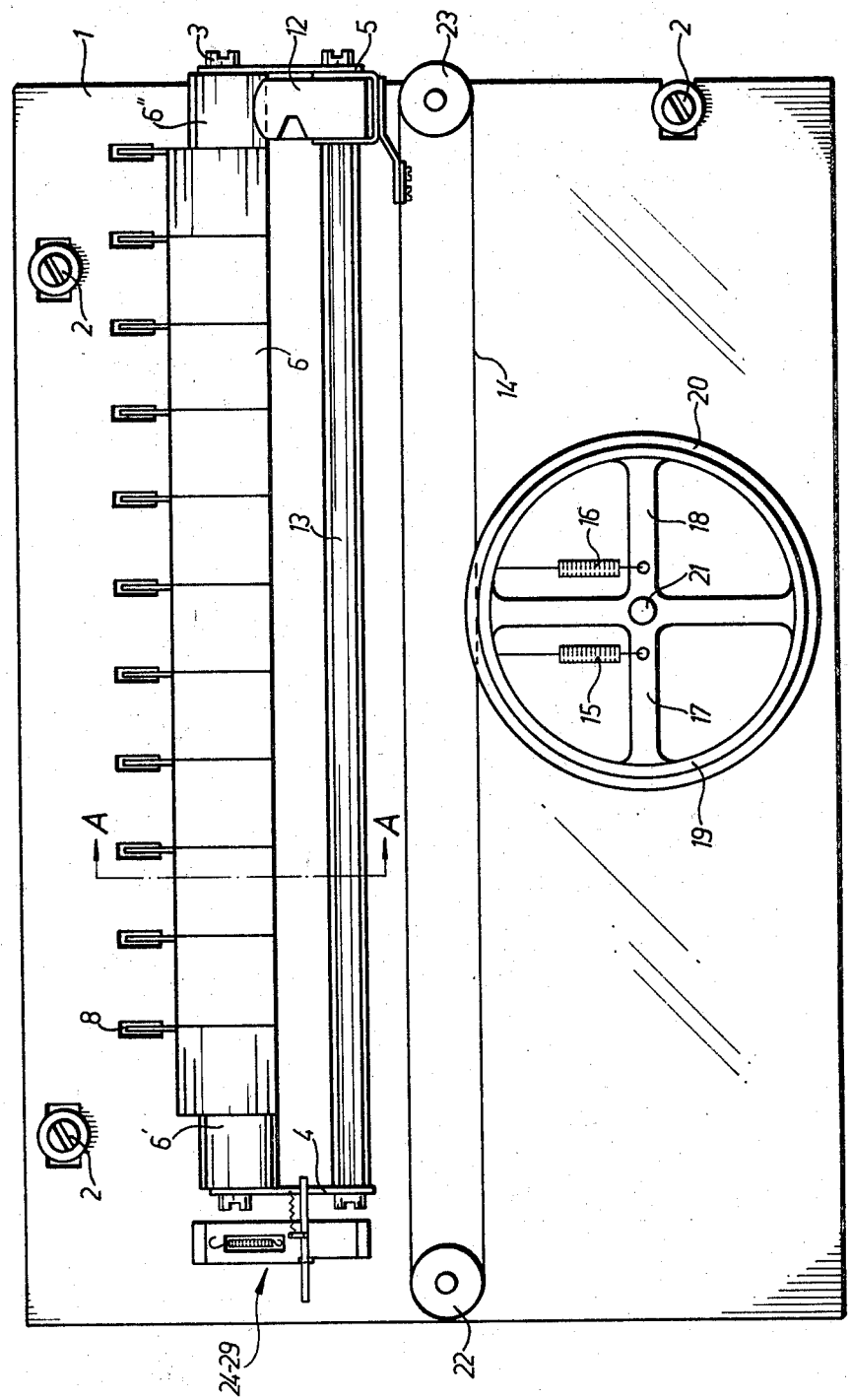

The present invention relates to a method for the checking of multidigit numbers and is particularly suitable for the checking of a number entered into a cash register, calculating machine or similar office machine.

To be able to detect the registration errors that most often occur when entering a multidigit number, such as a membership number, subscribed number and spare parts number, into an office machine it is previously known to enter one or several check digits together with respective numbers.

A common method is to add to the multidigit number a check digit, chosen to make the transverse sum of the entered digits in the number plus the entered check digit divisible by another predetermined number. This makes it possible, with 100% certainty, to detect errors resulting from erroneous entering of a digit in the number. However, errors resulting from the switching of two digits are not detected, since the sum remains the same.

The use of a so-called weighted transverse sum has been suggested, i.e. a transverse sum where each digit included in the multidigit number is multiplied by a factor, the value of which is determined by the position of the digits in the number, after which the sum of the resulting products and the check digit, when the number is correctly entered, will be divisible by another predetermined number. This method makes it possible to detect, with 100% certainty, errors caused by erroneous entering of a digit in the number. It further makes it possible to detect, with 100% certainty, errors caused by the switching of the sequence of two or three digits, e.g. 43-34, 324-423. About 90% of the remaining errors which originate in the entering of the value are detected.

It has been suggested to check the numbers by this last mentioned method, by converting each entered digit into a corresponding number of electrical pulses, which by an electronic device is multiplied by a factor, the value of which is determined by the position of the digit, whereafter all the pulses are added and divided by a predetermined number by means of a counting and indicating device, which compares the resulting remainder with a reference number.

Such electrical devices are impaired by several disadvantages, such as sensitivity to environmental interference. They are also comparatively space consuming and command a high cost in production as well as in operation. Furthermore, these devices usually generate heat, which under certain circumstances reduces their operational reliability.

The purpose of the present invention is to eliminate the above mentioned disadvantages and the invention is substantially characterized by the digits entered into the machine each causing a counting wheel to be stepped a certain number of steps, which is determined partly by the value of the digit and partly by its position in the number, the total number of steps of the counting wheel being sensed by an indicating device, which indicates a correctly entered number if the number of steps of the counting wheel is divisible by a predetermined number and an incorrectly entered number if the number of steps of the counting wheel is not divisible by a predetermined number.

Figure 2:
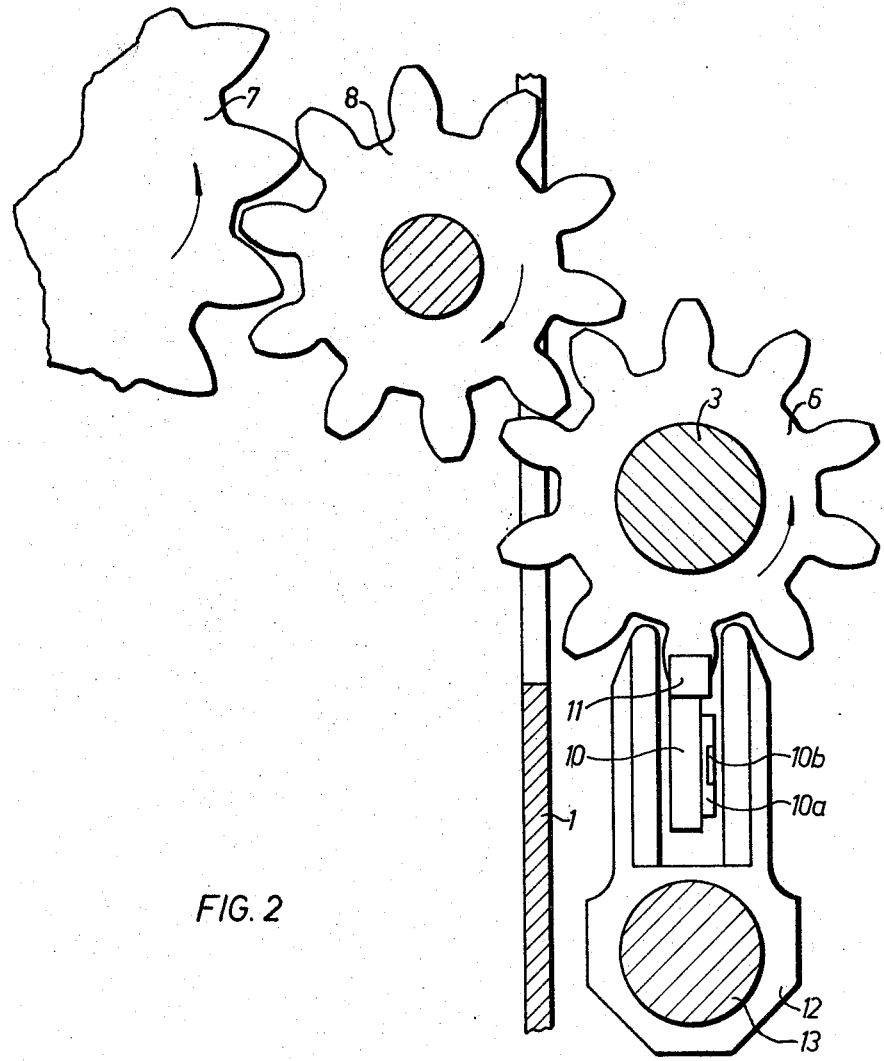
Figure 3A:
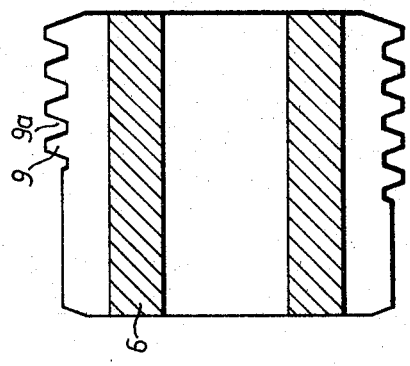
Figure 3:
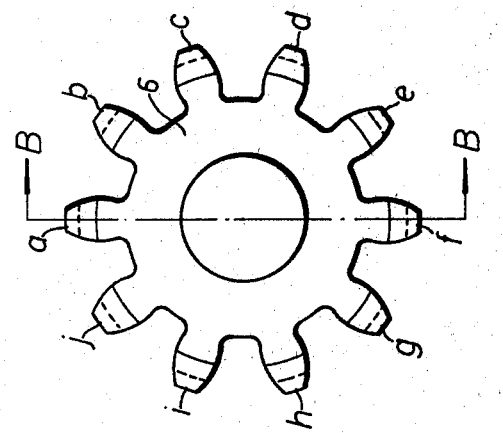
Figure 4:
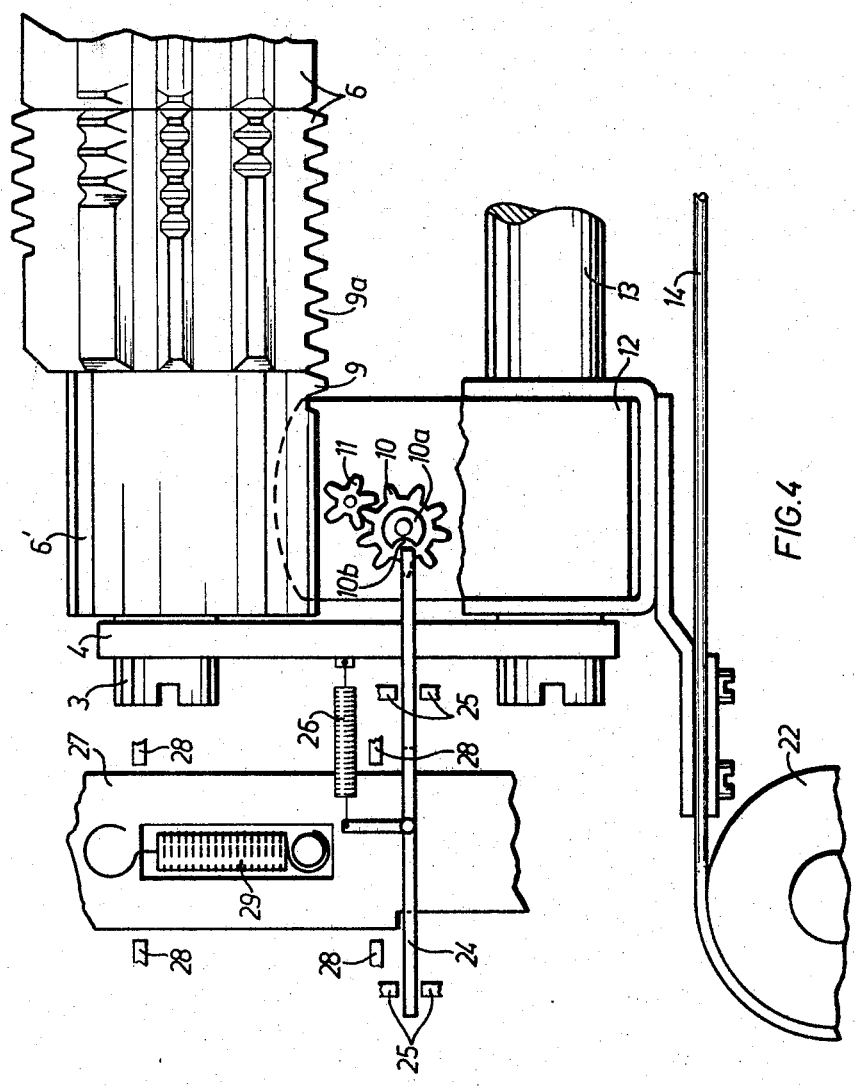

The invention will now be disclosed with reference to attached drawings where:
 FIG. 1 is a plan view of a checking device according to the invention.
 FIG. 2 shows a cut along line A—A in FIG. 1.
 FIG. 3 is a detail view of the device in FIGS. 1, 2.
 FIG. 3a shows a cut along line B—B in FIG. 3.
 FIG. 4 is an enlarged view of the indicating device and some details of the device according to FIG. 1.

With reference to FIGS. 1, 2 a shaft 3 is fastened (at 4 and 5) on a frame 1, preferably mounted by means of attachments 2 on the back of a cash register and on said shaft a plurality of code rollers 6, in the present embodiment 11 rollers are rotatably journaled immediately adjacent each other. The code rollers 6 are rotated and set on shaft 3 by a transfer gear 7-8 according to the digits entered into the machine. The most leftward code roller in FIG. 1 is thus set according to an entered check digit pertaining to a number. The second code roller from the left is set according to the digit entered into the first decade, the third code roller from the left according to the digit entered into the second decade etc.

Each code roller 6 has ten teeth $a$–$j$ (FIGS. 3, 3a), hereafter called code teeth. The top of each code tooth $a$–$j$ is provided with teeth 9 of smaller size, hereafter called test teeth. The space between two test teeth 9 is the same on each code tooth $a$–$j$, but only two of the ten code teeth on one given code roller 6 have the same number of test teeth.

The transfer gear 7-8 always gives the code rollers 6 such a position that their profiles coincide when viewed axially. The test teeth 9 on those code teeth $a$–$j$ on the code rollers, which face in the same direction will thus make up a tooth path parallel to the shaft 3. The tooth path thus formed and turned in a particular direction will engage a counting wheel 10 having 9 teeth to thus operate to modulo 9, via a ratchet wheel 11 having 5 teeth. The tooth path on each code tooth $a$–$j$ on each code roller 6 is in its right end shaped to start with half a tooth space changing over into a tooth and in its opposite end to end with half a tooth space changing into either a flat path in line with the partition line of the tooth path if the tooth path is shorter than the width of the code roller or a tooth if the length of the tooth path is the same as the width of the code roller. Thus there will always be a tooth space in the groove between two code rollers 6. The tooth path on each code tooth $a$–$j$ on the two outer code rollers 6 on the shaft 3 also starts and ends respectively with half a tooth space. Outside of and adjacent to these two code rollers an extension of the tooth path made up of all the code rollers has been arranged, which may engage the ratchet wheel 11. These extensions $6^I$, $6^{II}$ of the tooth path enclose, starting from the adjacent code roller, half a tooth space, one tooth and one tooth space changing into a flat path in line with the partition line of the tooth path. The extensions $6^I$, $6^{II}$ are fixed on the shaft 3.

The advantages of the above disclosed shaping of the ratchet wheel 11 and the tooth path turned towards the straight path of the ratchet wheel and made up of all the code rollers 6 are on one hand that the ratchet wheel does not rotate around its center as it is moved along said flat paths in line with the partition line of the tooth path and on the other hand that the groove between two adjacent code rollers or between the two fixed extensions $6^I$, $6^{II}$ respectively of the tooth path and adjacent code roller will not obstruct the ratchet wheel teeth as they pass over the groove.

The diagram below shows as an example the number of test tooth spaces on the various code teeth a-j on each code roller 6 according to FIG. 3a. Note, that in the case of one test tooth space theoretically being enough ten have been chosen since the number of test tooth spaces is greater than the number of test teeth.

| Designation of the code teeth on each code roller | The number of test tooth spaces for the code roller in decade— | | | | | | | | | | | Digit entered into the machine |
|---|---|---|---|---|---|---|---|---|---|---|---|---|
| | 11 | 10 | 9 | 8 | 7 | 6 | 5 | 4 | 3 | 2 | 1 | |
| a | 9 | 9 | 9 | 9 | 9 | 9 | 9 | 9 | 9 | 9 | 9 | 1 |
| b | 7 | 8 | 4 | 2 | 10 | 5 | 7 | 8 | 4 | 2 | 10 | 2 |
| c | 5 | 7 | 8 | 4 | 2 | 10 | 5 | 7 | 8 | 4 | 2 | 3 |
| d | 3 | 6 | 3 | 6 | 3 | 6 | 3 | 6 | 3 | 6 | 3 | 4 |
| e | 10 | 5 | 7 | 8 | 4 | 2 | 10 | 5 | 7 | 8 | 4 | 5 |
| f | 8 | 4 | 2 | 10 | 5 | 7 | 8 | 4 | 2 | 10 | 5 | 6 |
| g | 6 | 3 | 6 | 3 | 6 | 3 | 6 | 3 | 6 | 3 | 6 | 7 |
| h | 4 | 2 | 10 | 5 | 7 | 8 | 4 | 2 | 10 | 5 | 7 | 8 |
| i | 2 | 10 | 5 | 7 | 8 | 4 | 2 | 10 | 5 | 7 | 8 | 9 |
| j | 9 | 9 | 9 | 9 | 9 | 9 | 9 | 9 | 9 | 9 | 9 | 0 |

Example on the use of the system (see the diagram above):

The digits in the number 2325 together effect the stepping of 29 (10+8+6+5) tooth spaces of the ratchet wheel 11 and the counting wheel 10 (the number is entered into decades 2–5). If the number is supplemented by check digit 7 (entered into decade 1) a total stepping of 36 tooth spaces (29+7), i.e. four complete turns, is obtained on the counting wheel. This entry may be further explained by appending to the number to be entered, 2325, its check digit 7, thus showing the complete entry as 23257. When the 23257 is entered into the machine transfer gears 7 and 8 set their respective code rollers 6 so that decade 1 code roller 6 stands at 7, positioning 7 test teeth 9 (designation h) along the tooth path; decade 2 code roller 6 stands at 5, positioning 10 test teeth 9 (designation f) along the tooth path; decade 3 code roller 6 stands at 2, positioning 8 test teeth 9 (designation c) along the tooth path; decade 4 code roller 6 stands at 3, positioning 6 test teeth 9 (designation d) along the tooth path; and decade 6 code roller 6 stands at 2, positioning 5 test teeth 9 (designation c) along the tooth path. The total number of test teeth 9 thus positioned along the tooth path numbers 36 and when counting wheel 10 engages same it is rotated through 36 teeth positions. Since it only requires 9 teeth to rotate counting wheel 10 through an entire revolution it therefore rotates through 4 complete revolutions.

The ratchet wheel 11 and the counting wheel 10 are rotatably journaled in a slide 12 and are always in engagement with each other. A test disc 10a with a recess or indicia 10b is rigidly connected with the counting wheel 10. The slide 12 is attached to and axially movable on a shaft 13, which runs parallel to the shaft 3 of the code rollers 6 and is fastened in the frame 1. The slide 12 is fastened to a wire 14, the ends of which are fastened to spokes 17 and 18 of a wire wheel 19 by means of load springs 15 and 16. The wire wheel is along its periphery provided with a track 20 in which the wire 14 runs. The slide 12 and the shaft 21, on which the wire wheel is fastened, are controlled by the control means of the machine. The wire 14 runs over two rollers 22 and 23, which are journaled in the frame on a mutual distance of approximately the length of the shaft. When the slide moves the ratchet wheel 11 will be engaged by the test teeth of the code rollers and will be rotated by them. T slide system including a slide 24 guided by guide 25, fastened in the frame 1, and pulled to the right in the figure by spring 26, and a slide 27 guided by guide 28, fastened in the frame 1 and running in a cut in the slide, and pulled downwards by spring 29, is applied adjacent to the roller 22. When the test disc 10a is in its left end position, as shown in FIG. 2 the slide 24 may engage the recess 10b in the test disc or may have been moved to the left by the periphery of the test disc. The slide 24 prevents the slide 27 from being pulled downwards by the spring 29 only when the slide 24 is in its right position because an edge on slide 24 approximate the cut within which slide 29 runs engages a stop appropriately disposed on slide 29. When it is in its lower position the slide 27 can be moved upwards by a conventional cam disc (not shown in FIG. 1) controlled by the control means normally provided with these types of machines.

When a number has been entered correctly into the machine, a number of test tooth spaces divisible with another selected number, in this example 9, are included in the tooth path made up of all the code rollers 6, which the ratchet wheel 11 will engage and be turned by, when the slide 12 is moved leftwardly from its home position to the far right. This will turn the ratchet wheel 11 and thereby the counting wheel 10 one tooth space for each tooth space in the tooth path.

The system used in this example is based on the fact that the digit entered into a decade is multiplied by a factor in the same decade according to the table below.

| Decade | 11 | 10 | 9 | 8 | 7 | 6 | 5 | 4 | 3 | 2 | 1 |
|---|---|---|---|---|---|---|---|---|---|---|---|
| Factor | 7 | 8 | 4 | 2 | 1 | 5 | 7 | 8 | 4 | 2 | 1 |

If each of the resulting products exceeds the earlier mentioned preselected number 9, then 9 is subtracted from it. If the product exceeds 18 (2×9), 18 is subtracted from it etc. A digit, added to the number as a check digit and entered into decade 1, so chosen, that the resulting final sum is divisible by the selected number 9, is added to the sum of these products and/or balances (in the case where the product exceeds 9), which are noted at test tooth spaces in the table, column 3. If the digits have been correctly entered into the machine, then the number of tooth spaces in the tooth path, along which the ratchet wheel 11 is intended to be moved, made up of all the code rollers 6 must be divisible by 9. The counting wheel 10 and test disc 10a will be rotated counterclockwise via the ratchet wheel 11 from its home position to the far right where the recess 10b in the test disc points to the left and is in line with the slide 24, a certain number of complete turns depending on the entered digits, when the slide 12 is moved to its left end position. When the slide 12 reaches its left end position the slide 24 will consequently fit into the recess 10b in the test disc 10a since it has been turned a certain number of complete turns and not fractions thereof. Because of this the slides 24 and 27 have not been operated by the test disc. When the slide 12 reaches its left end position in the above mentioned manner, it is returned to the home position to the far right by conventional operating means not shown in the figure, while the counting wheel 10 and the test disc 10a are rotated clockwise by the same number of turns that they were previously rotated counterclockwise because of the engagement by the ratchet wheel 11 with the tooth path made up by the unchanged code rollers. Said operations take place during the first one of two consecutive cycles of the machine and during this first cycle the digits are also entered into the indicator of the machine and during the last cycle of the machine the digits are printed and the operated keys released.

If the digits have been entered incorrectly the number of tooth spaces in the tooth path made up of all the code rollers 6 along which the ratchet wheel 11 is intended to be moved will not be divisible by 9. The counting wheel 10 and the test disc 10a will thus be rotated counterclockwise a certain number of complete turns and/or fractions thereof via the ratchet wheel 11 when the slide 12 is moved from its right to its left end position. When the slide 12 reaches its left end position the test disc 10a has, with its periphery facing the slide 24, moved the rightwardly spring loaded slide 24 to the left a distance corresponding approximately to the depth of the recess 10b. The slide 27 is released by the slide 24 and pulled downwards by the spring 29 because (as mentioned in lines 14–18, column 4) slide 27 is only free to move under action of its spring 29 when slide 24 is so positioned. The slide 12 is returned to its right home position. The described operations thus take place during one of normally, i.e. when the digits have been correctly entered, two consecutive machine cycles, at the end of which the machine is stopped by the downwardly pulled slide 27. During this machine cycle the digits are entered into the indicator of the machine and the operated keys are released under control of the downwardly pulled slide 27, while the printing of the digits, normally performed during the second machine cycle, does not occur.

In a second attempt to enter the correct digits once again the slides 27 and 24 will be returned to their original positions by the machine and the spring 26 respectively, during an early part of normally two consecutive machine cycles.

Though the disclosed description and drawings only pertain to one embodiment of the invention it is obvious that numerous modifications are possible within the scope of the following patent claims. The ratchet wheel 11 may thus be allowed to sense and count the number of test teeth instead of the number of test tooth spaces as described above.

I claim:
1. Apparatus for checking the accuracy of the positioning of a plurality of ordinally disposed movable means each of which is adapted to be selectively moved to digit positions representative of the value of an ordinally disposed digit of a multi digit number comprising:
   (a) a plurality of test means associated with each of the movable means;
   (b) each of said plurality of test means for each of the movable means corresponding to one of the digit positions thereof, having a value related to said digit position, and being adapted to be moved to a position disposed along a test line;
   (c) sensing means disposed for movement along said test line, to sense the value of each of the test means disposed therealong and to provide an indication of the cumulative value thereof to a predeterminetd modulo.

2. The apparatus of claim 1 wherein said value of each of said test elements is weighted according to a predetermined formula.
3. The apparatus of claim 2 wherein said formula weights said value according to the digit value of said digit position.
4. The apparatus of claim 2 wherein said formula weights said value according to the ordinal position thereof.
5. The apparatus of claim 1 wherein said sensing means provides a first indication indicative of a correct positioning of the movable means and a second indication indicative of an incorrect positioning of the movable means.
6. The apparatus of claim 1; wherein the movable means each include a plurality of digit teeth with each of said digit teeth aligned with a digit position.
7. The apparatus of claim 6 wherein:
   (a) each of said digit teeth is of a predetermined thickness;
   (b) wherein said thickness of each of said digit teeth constitutes said test means and includes a number of test teeth representative of the value assigned to the digit position; and
   (c) said sensing means includes a toothed gear disposed for movement along said test line for meshing engagement with the test teeth disposed therealong.
8. The apparatus of claim 7 wherein said toothed gear carries a cam carrying an indicia on its surface corresponding to a predetermined position thereof, and said sensing means further includes a spring biased cam follower coacting with said cam and responsive to said indicia to provide an indication that the movable means are correctly positioned.
9. The apparatus of claim 8 wherein said indicia constitutes a depression in said cam.
10. The apparatus of claim 6 wherein said movable means is in the form of a gear wheel disposed for rotation about a predetermined axis.
11. The apparatus of claim 10 wherein said test line runs parallel to said predetermined axis.
12. The apparatus of claim 1 wherein the movable means are each disposed for coaction with an indicating wheel of a cash register.

References Cited

UNITED STATES PATENTS

| 2,990,114 | 6/1961 | Hudec | 235—60.4 |
| 2,241,591 | 5/1941 | Gates | 235—61.7 |
| 3,166,243 | 1/1965 | Torre | 235—61 |
| 3,183,482 | 5/1965 | Aberth et al. | 235—61.7 XR |

FOREIGN PATENTS 740,007  11/1955  Great Britain.

STEPHEN J. TOMSKY, Primary Examiner